(12) United States Patent
Jiang et al.

(10) Patent No.: US 10,940,514 B2
(45) Date of Patent: Mar. 9, 2021

(54) IN-SITU THERMAL DESORPTION SYSTEM, IN-SITU THERMAL DESORPTION-OXIDATION REPAIR SYSTEM AND REPAIR METHOD

(71) Applicant: CHINESE RESEARCH ACADEMY OF ENVIRONMENTAL SCIENCES, Beijing (CN)

(72) Inventors: Yonghai Jiang, Beijing (CN); Beidou Xi, Beijing (CN); Yu Yang, Beijing (CN); Xinying Lian, Beijing (CN); Huan Huan, Beijing (CN); Fu Xia, Beijing (CN); Xu Han, Beijing (CN); Xiangjian Xu, Beijing (CN)

(73) Assignee: Chinese Research Academy of Environmental Sciences, Beijing (CN)

( * ) Notice: Subject to any disclaimer, the term of this patent is extended or adjusted under 35 U.S.C. 154(b) by 0 days.

(21) Appl. No.: 16/183,514

(22) Filed: Nov. 7, 2018

(65) Prior Publication Data
US 2019/0143385 A1  May 16, 2019

(30) Foreign Application Priority Data
Nov. 14, 2017  (CN) .......................... 201711127991.X

(51) Int. Cl.
*B09C 1/00* (2006.01)
*B09C 1/06* (2006.01)
*B09C 1/08* (2006.01)

(52) U.S. Cl.
CPC .............. *B09C 1/065* (2013.01); *B09C 1/002* (2013.01); *B09C 1/06* (2013.01); *B09C 1/08* (2013.01); *B09C 2101/00* (2013.01)

(58) Field of Classification Search
CPC ............ B09C 1/06; B09C 1/065; B09C 1/005
See application file for complete search history.

(56) References Cited

U.S. PATENT DOCUMENTS

| 4,773,488 A | * | 9/1988 | Bell | .......................... | E21B 7/04 |
| | | | | | 175/61 |
| 5,009,266 A | * | 4/1991 | Dieter | ....................... | B09C 1/00 |
| | | | | | 166/245 |

(Continued)

*Primary Examiner* — Janine M Kreck
(74) *Attorney, Agent, or Firm* — Seed IP Law Group LLP

(57) ABSTRACT

An in-situ thermal desorption system, an in-situ thermal desorption-oxidation remediation system and a remediation method are provided, wherein the in-situ thermal desorption system comprises a heating device and an extraction device, wherein the heating device is used for transporting heated air to the contaminated soil to desorb the organic pollutants, and wherein the extraction device is used for sucking the desorbed organic pollutants. The in-situ thermal desorption-oxidation remediation system adds a thermal catalytic oxidation device based on the in-situ thermal desorption system, wherein the organic pollutants extracted by the extraction device are catalytically degraded in the thermal catalytic oxidation device, and a device for recycling and reprocessing an exhaust gas is further added. The present disclosure also provides an in-situ thermal desorption-oxidation remediation method. The heating method of the present disclosure is novel, which reduces the cost of thermal desorption, strengthens the heating area, improves the heating efficiency, further enhances the thermal catalytic oxidation efficiency, and achieves the reuse and recycle of the exhaust gas. Thus, no secondary exhaust gas is produced.

20 Claims, 2 Drawing Sheets

(56) References Cited

U.S. PATENT DOCUMENTS

| | | | | |
|---|---|---|---|---|
| 5,011,329 A | * | 4/1991 | Nelson | B09C 1/06 |
| | | | | 405/128.65 |
| 5,114,497 A | * | 5/1992 | Johnson | B09C 1/06 |
| | | | | 134/21 |
| 5,249,888 A | * | 10/1993 | Braithwaite | B09C 1/005 |
| | | | | 405/128.35 |
| 2010/0104369 A1 | * | 4/2010 | Chen | B09C 1/005 |
| | | | | 405/128.85 |

* cited by examiner

IN-SITU THERMAL DESORPTION SYSTEM, IN-SITU THERMAL DESORPTION-OXIDATION REPAIR SYSTEM AND REPAIR METHOD

TECHNICAL FIELD

The present disclosure belongs to the technical field of organic contaminated soil and groundwater remediation, and particularly relates to an in-situ thermal desorption system, an in-situ thermal desorption-oxidation remediation system and a remediation method.

BACKGROUND

In recent years, with the acceleration of urbanization and industry transfer in China, enterprises in economically developed areas have continuously migrated or closed down. Among them, there are many high pollutant discharge enterprises such as chemical plants, pharmaceutical factories, paper mills and electroplating factories, which have left a lot of complicated organic contaminated sites, and these sites might be basically used for residential land, public facilities construction land and green land, which have great potential to harm to human health, environmental safety and social stability.

At present, the organic pollutants in the contaminated soil are mainly petroleum hydrocarbons, pesticides, polycyclic aromatic hydrocarbons, etc. The main remediation technologies include physical remediation, chemical remediation, bioremediation and combined remediation. Due to the complexity of the geological conditions of the contaminated sites, the particularity of volatile organic pollutants and the uneven distribution of pollutants in the soil, a single remediation technology often fails to achieve the expected remediation goal, and the need for combined remediation technology is particularly urgent. The combination of in-situ thermal desorption technology and chemical oxidation technology can accelerate the volatilization or separation of organic pollutants having strong adsorption and poor water solubility in groundwater, and can improve soil properties, soil permeability and mass transfer speed of pollutants. However, in-situ thermal desorption technology has higher energy consumption and lower heat utilization efficiency. Chemical oxidation technology would produce by-products, such as dioxin, which is produced during the treatment of chlorinated organic compounds. Therefore, how to reduce the thermal desorption energy, achieve energy saving, and reduce the generation of oxidation by-products is the problem that need to be solved in the current thermal desorption-oxidation remediation technology.

SUMMARY

In view of this, the primary objective of the present disclosure is to provide an in-situ thermal desorption system, an in-situ thermal desorption-oxidation remediation system, and a remediation method in order to at least partially address at least one of the above mentioned technical problems.

In order to achieve the above objective, the technical solution of the present disclosure is as follows:

In an aspect of the present disclosure, it provides an in-situ thermal desorption system comprising a heating device and an extraction device, wherein the heating device comprises a plurality of heating inclined wells arranged in the contaminated area and an air supply member, an air heater and a plurality of heating pipes connected in sequence, wherein the air supplied by the air supply member is heated by the air heater to enter the heating pipe disposed in the heating inclined well for transporting heated air and passing the heated air through the heating inclined well into the contaminated soil, thereby thermally desorbing the organic pollutants in the contaminated soil;

The extraction device comprises a plurality of extraction wells arranged in the contaminated area, a plurality of extraction pipes and a first suction member, wherein the organic pollutants thermally desorbed in the contaminated soil are drove by the power provided by the first suction member to pass the extraction well and sucked into the extraction pipe.

Preferably, in the in-situ thermal desorption system, there are more than two heating inclined wells, while every two heating inclined wells and one extraction well form a distribution of " ↑ " shape.

Preferably, two said heating inclined wells and two said extraction wells are arranged to form a basic repair unit, or two said heating inclined wells and three said extraction wells are arranged to form a basic repair unit.

Preferably, the length $L_1$ of the heating inclined well is $$\frac{h}{\sin\theta} \sim \frac{L_2}{\sin\theta},$$

wherein h is the depth of extraction well and θ is the horizontal inclination angle of the heating inclined well which is preferably 30°~60°, $L_2$ is the pollution depth; wherein the depth h of the extraction well is less than or equal to the pollution depth $L_2$, and the extraction well spacing is $$\frac{K}{2} + \frac{h}{\tan\theta} \sim K + \frac{L_2}{\tan\theta},$$

wherein K is the distance between the heating inclined wellheads, preferably 0 to 3 m, and the distance between the repair units is 2 m to 6 m.

Preferably, said heating device further comprises a solar photovoltaic module coupled to the air heater for powering the air heater.

Preferably, the heating inclined well is externally filled with a heat conductive filler selected from one or more of α-alumina, zeolite and gravel.

The heating pipe is a coil pipe, and a plurality of openings are arranged on the pipe, preferably arranged according to one of the following rules: (1) the opening of the upper pipe is sparsely arranged, and that of the lower part is densely arranged; (2) the opening is evenly arranged on the heating pipe; (3) the opening is arranged only in the lower part of the pipe.

The extraction well is a heat-resistant material, and a plurality of openings are arranged on the well wall;

Pluralities of openings are arranged on the extraction pipe.

Preferably, the surface of the heating inclined well and the extraction well is provided with a heat insulating material.

In another aspect of the present disclosure, it provides an in-situ thermal desorption-oxidation remediation system comprising the in-situ thermal desorption system as described above and a thermocatalytic oxidation device, wherein the thermocatalytic oxidation device includes an oxygen gas supply member, a first temperature controller and a thermocatalytic oxidation reaction chamber, and the oxygen supplied from the oxygen gas supply member is heated by the first temperature controller and controlled to enter the thermocatalytic oxidation reaction chamber;

an extraction pipe of the in-situ thermal desorption system is coupled to the thermocatalytic oxidation reaction chamber such that the sucked organic pollutants enter the thermocatalytic oxidation reaction chamber to be catalytically degraded.

Preferably, the thermocatalytic oxidation reaction chamber is disposed in the upper part of the extraction well, and is −1.5 m to −0.5 m from the earth's surface, and has a length of 1 m 3 m, a width of 1 m~2 m, a height of 0.5 m~2 m, the outside of the thermocatalytic oxidation reaction chamber is provided with a heat insulation structure.

Preferably, the thermocatalytic oxidation reaction chamber is located at the outlet of the first suction member and is provided with an air distribution plate bearing gas-liquid separating agent.

Preferably, the thermocatalytic oxidation reaction chamber is filled with a catalyst selected from a supported or unsupported noble metal catalyst, wherein the carrier of the supported noble metal catalyst is selected from ceramic honeycomb coal or γ-$Al_2O_3$.

Preferably, the catalyst is a detachably modular catalyst.

Preferably, the in-situ thermal desorption-oxidation remediation system further comprises a device for recycling and reprocessing an exhaust gas, and the device for recycling and reprocessing an exhaust gas includes an exhaust gas online monitoring equipment, a second temperature controller, a control valve, and a second suction member, wherein the exhaust gas online monitoring equipment is connected to the outlet of the thermocatalytic oxidation reaction chamber;

the exhaust gas sucked from the thermocatalytic oxidation reaction chamber by the second suction member is detected for the concentration of the organic pollutants via the exhaust gas online monitoring equipment in real time, and according to whether the concentration of the organic pollutant reaches the standard or not, the exhaust gas is controlled by the control valve to be discharged or to enter the heating pipe, and wherein the second temperature controller is used to heat and control the exhaust gas before the exhaust gas enters the heating pipe.

Based on the above technical solutions, the beneficial effects of the present disclosure are:

(1) The heating method of the present disclosure is novel which relates to the solar-thermal conversion concept, wherein heated air is used, not only effectively heating the contaminated soil and groundwater by the heat transfer method of heat convection, but also greatly reducing the cost of thermal desorption;

(2) The design of the heating inclined well and the extraction well repair unit of the present disclosure has novelty. The heating inclined well has a large heating area and high heating efficiency, and greatly accelerates the thermal desorption of organic pollutants in the contaminated soil and groundwater, and strengthens the extraction efficiency of the extraction well, thus the thermal catalytic oxidation efficiency is also enhanced;

(3) The present disclosure adopts the concept of recycling exhaust gas heat, by using a device for reprocessing and recycling exhaust gas, to reduce waste of heat, to realize energy resource recycling. Therefore no secondary exhaust gas is generated, and heat desorption cost is significantly reduced. At the same time, the designed thermal catalytic oxidation technology has the advantages of low operating temperature, high catalytic oxidation efficiency, no secondary pollutants, small equipment volume and strong operability.

DRAWINGS

Figure 1:
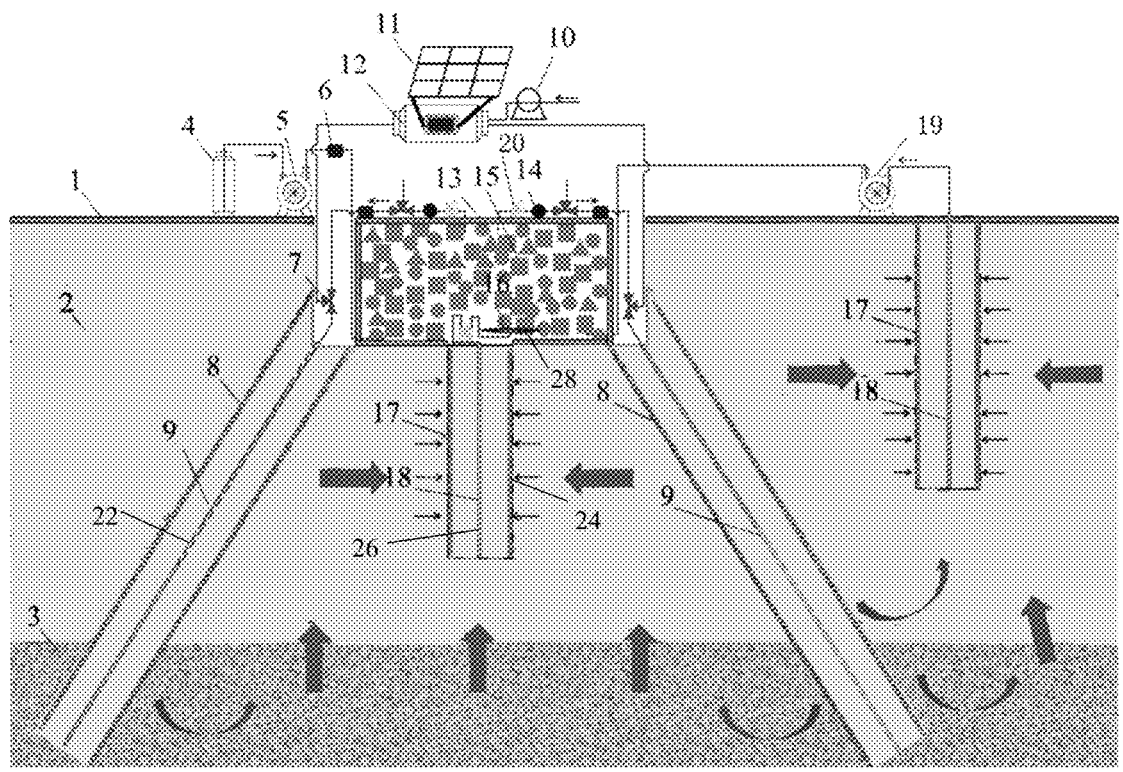
FIG. 1 is a schematic structural view of an in-situ thermal desorption-oxidation remediation system of an organic contaminated site according to an embodiment of the present disclosure.
Figure 2:
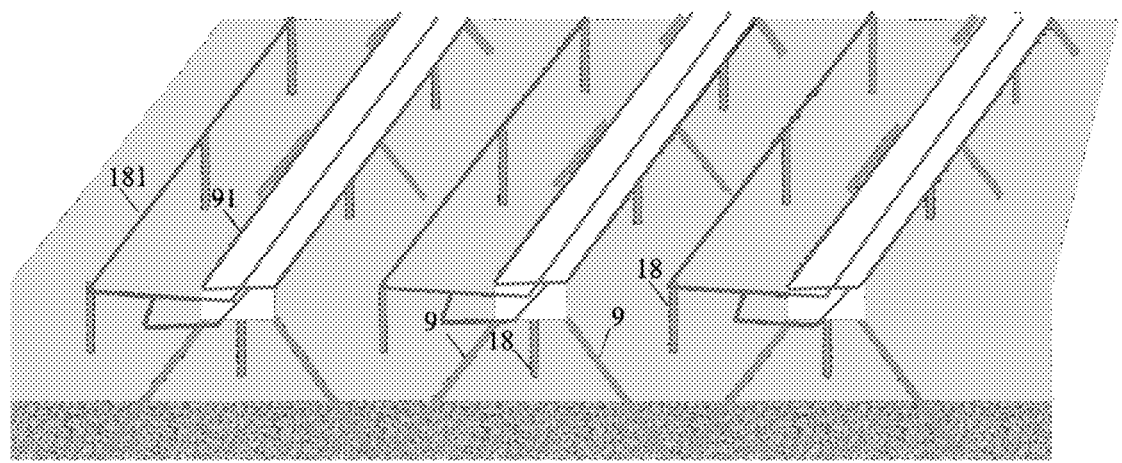
FIG. 2 is a schematic view showing the well spacing and connection of external pipeline of in-situ thermal desorption-oxidation system of an organic contaminated site according to an embodiment of the present disclosure.

The numbers have the following representations: 1-heat insulation material, 2-soil, 3-groundwater, 4-oxygen tank, 5-third suction member, 6-temperature controller, 7-triple valve, 8-heating inclined well, 9-heating pipe, 10-air supply member, 11-solar photovoltaic modules, 12-air heater, 13-catalytic oxidation reaction chamber, 14-exhaust gas online monitoring equipment, 15-catalyst, 16-air distribution plate, 17-extraction well, 18-extraction pipe, 19-first suction member, 20-second suction member, 91-external heating pipeline, 181-external extraction pipeline, 22-openings on heating pipe, 24-openings on well wall of extraction well. 26-openings on extraction pipe, 28-gas-liquid separating agent.

DETAILED DESCRIPTION

The present disclosure will be further described in detail below with reference to the specific embodiments of the invention and accompanying drawings.

Aiming at the special nature of pollutants in organic contaminated sites, the uneven distribution of pollutants in the site, and the high energy consumption of repairing, the present disclosure proposes an in-situ thermal desorption-oxidation repair system and a repair method for an organic contaminated site, wherein with the aid of solar photovoltaic modules and the air heater, the blasted air is heated, and then is injected into heating inclined wells which are constructed in the contaminated site, collected in the extraction pipeline of the extraction system, and then enters into the thermal catalytic oxidation device. After the thermal catalytic oxidation degradation, the heated exhaust gas is re-injected into the heating inclined wells, which realizes the recycling of the heated exhaust gas that is used to heat the organic contaminated site. The cycle then repeats itself, and the remediation of the organic contaminated site can be achieved.

The present disclosure also provides an in-situ thermal desorption-oxidation repair method for an organic contaminated site, the specific steps of which are as follows:

Step 1: According to the pollutant characteristics of the contaminated site and the specific conditions of the site hydrogeology, the heating inclined well and the extraction well are selected to be built on the contaminated site, and the inclined angle of the heating inclined well is 30°~60°, and the thermal catalytic oxidation reaction chamber are filled with the modular noble metal catalyst and then the devices in the system are connected in sequence.

Step 2: Turn on the solar photovoltaic module, the air supply member and the air heater, and inject the already heated air into the inclined wells constructed in the contaminated site, and the organic pollutant are heated and desorbed; then turn on the extraction device and the thermal catalytic oxidation device, wherein the exhaust gas online monitoring equipment is checked in real time, and the operating conditions are flexibly selected according to the detection standard.

Step 3: If the detection is not up to standard, the exhaust gas that reaches the set temperature after passing through the second temperature controller, is re-injected into the heated inclined well, and once again passes through the extraction device and the thermal catalytic oxidation device. The exhaust gas online monitoring equipment is checked in real time. If the detection is up to standard, it will be discharged directly.

Step 4: The temperature controller is flexibly adjusted according to the temperature changes of each part in real time, so as to stabilize the operating efficiency of the system.

Step 5: According to the change of real-time online monitoring data of the exhaust gas, determine whether the remediation of the organic pollutants in the contaminated site is completed or not. The technical solutions of the present disclosure are further described below by way of specific embodiments.

Example 1

Figure 3:
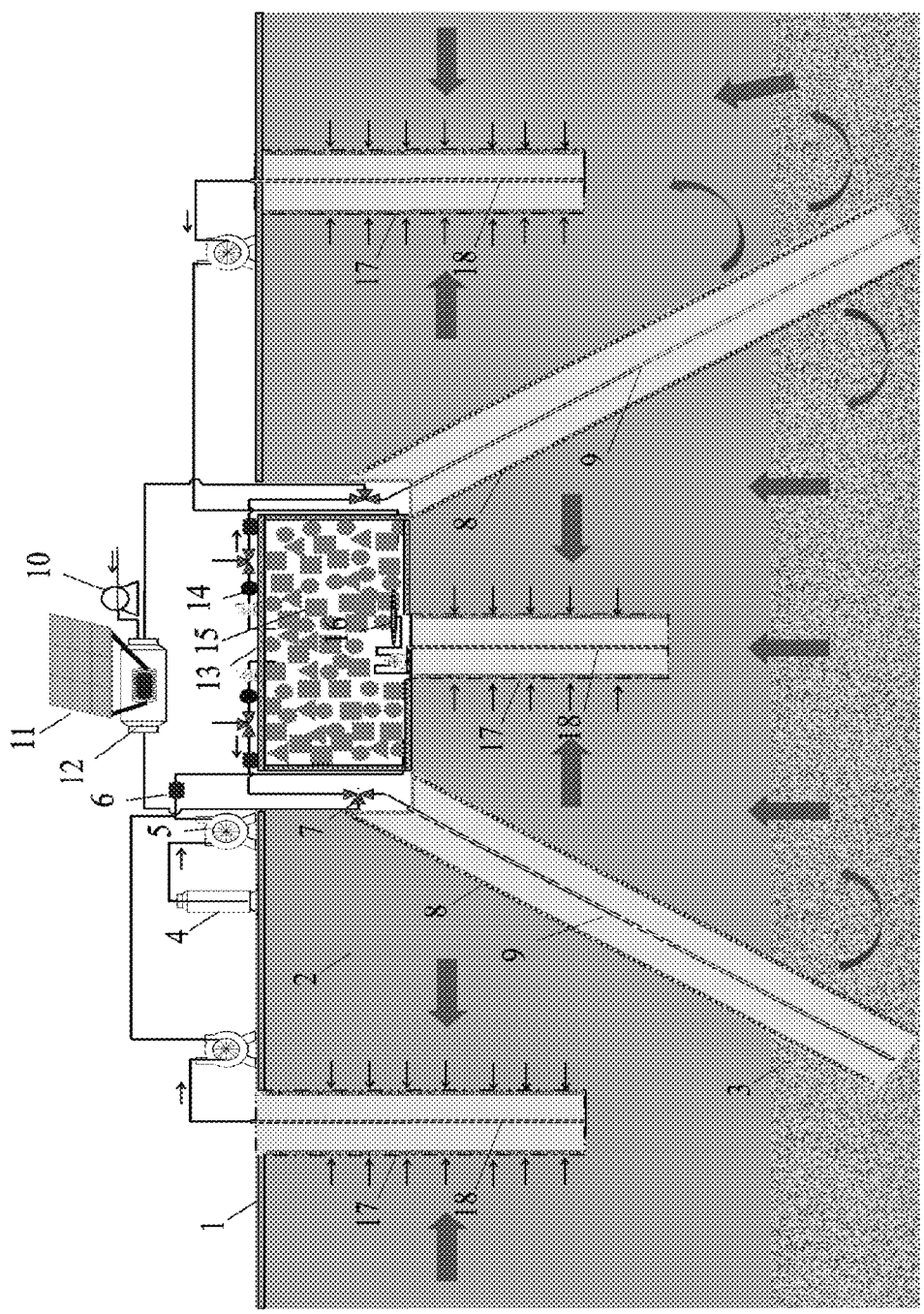
FIG. 3 is a schematic view showing an extraction device having three extraction wells and two heating inclined wells to form a basic remediation unit according to an embodiment of the present disclosure.

For a VOC contaminated site, the pollutants are mainly petroleum hydrocarbons and polycyclic aromatic hydrocarbons. Through the preliminary site investigation, the scope of the contaminated soil was determined. The area of the contaminated site was 1500 m2, and the pollution depth was 10.5 m, wherein the pollution depth of the soil was 8.0 m and the depth of the contaminated groundwater was 2.5 m. According to the concentration distribution of pollutants in the contaminated site, a heating inclined well having an angle of 60° with the vertical direction was selected to be constructed, wherein zeolite and gravel having a better thermal conductivity were selected as the outer packing of the heating inclined well. The length of the heating inclined well was 21.0 m, and the internal heating pipe was set as 60.0 m of spring-shaped stainless steel open-cell material, wherein the density of open porosity in the lower part was set to be 5 times of that in the upper part. The extraction well was 6.2 m high. The catalyst used in the thermal catalytic oxidation reaction chamber was a noble metal catalyst supported on ceramic honeycomb coal containing 0.5% Pd. The solar photovoltaic module heated the air to 200° C. via air heater. The design and construction were completed in accordance with the device and method provided by the present disclosure. According to the characteristics of the contaminated site, 30 extraction wells and 20 heating inclined wells were built, while 3 extraction wells 17 and 2 heating inclined wells 8 were set up to form a basic remediation unit, as illustrated in FIG. 3. The spacing between the extraction wells was 18 m. The distance between the remediation units was 5.0 m. The various parts of the device according to the present disclosure were connected in order to activate the remediation device. After 5 days of reaction, it was found that the removal efficiency of petroleum hydrocarbons and polycyclic aromatic hydrocarbons in groundwater was 99.5% and 92.3%, respectively. The removal efficiency of petroleum hydrocarbons and polycyclic aromatic hydrocarbons in soil was 95.2% and 91.5%, respectively.

The embodiments, the technical solutions, and the beneficial effects of the present invention are further described in details. It is understood that the foregoing description is only exemplary embodiments of the present invention. All modifications, equivalent substitutions, improvements and the like are intended to be included within the scope of the present invention The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including but not limited to Chinese Patent Application No. 201711127991.X, filed Nov. 14, 2017, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. An in-situ thermal desorption system comprising a heating device and an extraction device, wherein
the heating device includes a plurality of heating inclined wells arranged in a contaminated area, an air supply member, an air heater, and a plurality of heating pipes, wherein the air supplied by the air supply member is heated by the air heater to enter the heating pipe disposed in the heating inclined well for transporting heated air and passing the heated air through the heating inclined well into contaminated soil, thereby thermally desorbing organic pollutants in the contaminated soil, and
the extraction device comprises a plurality of extraction wells arranged in the contaminated area, a plurality of extraction pipes and a first suction member, wherein the organic pollutants thermally desorbed in the contaminated soil are driven by the power provided by the first suction member to pass the extraction well and sucked into the extraction pipe,
wherein in the in-situ thermal desorption system, two said heating inclined wells and three said extraction wells are alternately arranged to form a basic remediation unit.

2. The in-situ thermal desorption system according to claim 1, wherein the length $L_1$ of the heating inclined well is $$\frac{h}{\sin\theta} \sim \frac{L_2}{\sin\theta},$$

wherein h is the depth of extraction well and $\theta$ is the horizontal inclination angle of the heating inclined well, $L_2$ is the pollution depth; wherein the depth h of the extraction well is less than or equal to the pollution depth $L_2$, and the extraction well spacing is $$\frac{K}{2} + \frac{h}{\tan\theta} \sim K + \frac{L_2}{\tan\theta},$$

wherein K is the distance between the heating inclined wellheads, and the distance between the remediation units is 2 m to 6 m.

3. The in-situ thermal desorption system according to claim 1 wherein said heating device further comprises a solar photovoltaic module coupled to the air heater for powering the air heater.

4. The in-situ thermal desorption system according to claim 1, wherein,
the heating inclined well is externally filled with a heat conductive filler selected from one or more of α-alumina, zeolite and gravel;
the heating pipe is made of a coil pipe, and a plurality of openings are arranged on the heating pipe according to one of the following rules: (1) a first set of the openings in an upper part of the heating pipe are sparsely arranged, and a second set of the openings in a lower part of the heating pipe are densely arranged; (2) the openings are evenly arranged on the heating pipe; or (3) the openings are arranged only in the lower part of the heating pipe;
the extraction well includes a heat-resistant material and has a well wall, and a plurality of openings are arranged on the well wall; and
a plurality of openings are arranged on the extraction pipe.

5. The in-situ thermal desorption system according to claim 1, wherein a ground surface through which the heating inclined well and the extraction well are arranged is provided with an insulating material.

6. An in-situ thermal desorption-oxidation repair system comprising the in-situ thermal desorption system according to claim 1 and a thermocatalytic oxidation device, wherein,
the thermocatalytic oxidation device includes an oxygen gas supply member, a first temperature controller and a thermocatalytic oxidation reaction chamber, and the oxygen supplied from the oxygen gas supply member is heated by the first temperature controller and controlled to enter the thermocatalytic oxidation reaction chamber; and
an extraction pipe of the in-situ thermal desorption system is coupled to the thermocatalytic oxidation reaction chamber such that the sucked organic pollutants enter the thermocatalytic oxidation reaction chamber to be catalytically degraded.

7. The in-situ thermal desorption-oxidation repair system according to claim 6, wherein, the thermocatalytic oxidation reaction chamber is disposed in an upper part of the extraction well, and is −1.5 m to −0.5 m from a ground surface, and has a length of 1 m~3 m, a width of 1 m~2 m, a height of 0.5 m~2 m, an outside of the thermocatalytic oxidation reaction chamber is provided with a heat insulation structure.

8. The in-situ thermal desorption-oxidation repair system according to claim 6, wherein, the thermocatalytic oxidation reaction chamber is located at an outlet of the first suction member and is provided with an air distribution plate with a gas-liquid separating agent.

9. The in-situ thermal desorption-oxidation repair system according to claim 6, wherein, the thermocatalytic oxidation reaction chamber is filled with a catalyst selected from a supported or unsupported noble metal catalyst, wherein the carrier of the supported noble metal catalyst is selected from ceramic honeycomb coal or γ-$Al_2O_3$.

10. The in-situ thermal desorption-oxidation repair system according to claim 6, wherein,
the in-situ thermal desorption-oxidation repair system further comprises a device for recycling and reprocessing an exhaust gas, and the device for recycling and reprocessing the exhaust gas includes an exhaust gas online monitoring equipment, a second temperature controller, a control valve, and a second suction member, wherein the exhaust gas online monitoring equipment is connected to an outlet of the thermocatalytic oxidation reaction chamber; and
wherein the exhaust gas sucked from the thermocatalytic oxidation reaction chamber by the second suction member is detected for the concentration of the organic pollutants via the exhaust gas on-line monitoring equipment, and according to whether the concentration of the organic pollutant reaches a standard or not, the exhaust gas is controlled by the control valve to be discharged or to enter the heating pipe, and wherein the second temperature controller is used to heat and control the exhaust gas before the exhaust gas enters the heating pipe.

11. A repair method by using the in-situ thermal desorption-oxidation repair system according to claim 6, comprising the steps of:
(1): constructing and connecting the heating device, the extraction device and the thermocatalytic oxidation device;
(2): turning on the air heater to inject the heated air into the inclined well in the contaminated area, to heat and to desorb the organic pollutants;
(3): turning on the extraction device and the thermocatalytic oxidation device, to suck the heated desorbed organic pollutants into the thermocatalytic oxidation device for catalytic degradation.

12. The repair method according to claim 11, further comprising the following steps of recycling and reprocessing an exhaust gas after the third step:
(4): using an exhaust gas online monitoring equipment to detect the concentration of organic pollutants in the catalytically degraded exhaust gas;
(5): if the detection is not up to the standard, the heated exhaust gas is re-injected into the heating inclined well, and then the pollutants are thermally desorbed and catalytically oxidized by using the exhaust gas heat; if the detection reaches standard, the exhaust gas is directly discharged; and
(6): according to the change of the real-time online monitoring data of the exhaust gas, determining whether the repair of the organic pollutants in the contaminated area is completed or not.

13. The repair method according to claim 12, wherein the air heater has a heating temperature of 100° C. to 300° C.; and the first temperature controller controls the oxygen temperature to be 100° C. to 300° C.; the temperature in the thermocatalytic oxidation reaction chamber is 100° C. to 300° C.; and the temperature of the exhaust gas before entering the heating pipe is controlled by the second temperature controller to be 100° C. to 300° C.

14. The in-situ thermal desorption system according to claim 2, wherein θ is 30°~60°, and K is 0 to 3 m.

15. The in-situ thermal desorption-oxidation repair system according to claim 9, wherein the catalyst is a detachably modular catalyst.

16. An in-situ thermal desorption-oxidation repair system, comprising:
- an in-situ thermal desorption system comprising:
  - a heating device comprising a plurality of heating inclined wells arranged in a contaminated area, an air supply member, an air heater, and a plurality of heating pipes, wherein the air supplied by the air supply member is heated by the air heater to enter the heating pipe disposed in the heating inclined well for transporting heated air and passing the heated air through the heating inclined well into contaminated soil, thereby thermally desorbing organic pollutants in the contaminated soil; and
  - an extraction device comprising a plurality of extraction wells arranged in the contaminated area, a plurality of extraction pipes and a first suction member, wherein the organic pollutants thermally desorbed in the contaminated soil are drove by the power provided by the first suction member to pass the extraction well and sucked into the extraction pipe,
  - wherein every two adjacent heating inclined wells of the plurality of heating inclined wells and a corresponding extraction well of the plurality of extraction wells therebetween are configured to form a "⊥" shape; and
- a thermocatalytic oxidation device comprising an oxygen gas supply member, a first temperature controller and a thermocatalytic oxidation reaction chamber, and the oxygen supplied from the oxygen gas supply member is heated by the first temperature controller and controlled to enter the thermocatalytic oxidation reaction chamber,
- wherein the extraction pipe of the in-situ thermal desorption system is coupled to the thermocatalytic oxidation reaction chamber such that the sucked organic pollutants enter the thermocatalytic oxidation reaction chamber to be catalytically degraded.

17. The in-situ thermal desorption-oxidation repair system according to claim 16, further comprising a device for recycling and reprocessing an exhaust gas, wherein the device includes an exhaust gas online monitoring equipment, a second temperature controller, a control valve, and a second suction member, wherein the exhaust gas online monitoring equipment is connected to an outlet of the thermocatalytic oxidation reaction chamber,
- wherein the exhaust gas sucked from the thermocatalytic oxidation reaction chamber by the second suction member is detected for the concentration of the organic pollutants via the exhaust gas on-line monitoring equipment, and according to whether the concentration of the organic pollutant reaches a standard or not, the exhaust gas is controlled by the control valve to be discharged or to enter the heating pipe, and wherein the second temperature controller is used to heat and control the exhaust gas before the exhaust gas enters the heating pipe.

18. The in-situ thermal desorption-oxidation repair system according to claim 16, wherein the thermocatalytic oxidation reaction chamber is filled with a catalyst selected from a supported or unsupported noble metal catalyst, wherein the carrier of the supported noble metal catalyst is selected from ceramic honeycomb coal or $\gamma$-$Al_2O_3$.

19. An in-situ thermal desorption system comprising:
- a heating device comprising a plurality of heating inclined wells arranged in a contaminated area, an air supply member, an air heater, and a plurality of heating pipes, wherein the air supplied by the air supply member is heated by the air heater to enter the heating pipe disposed in the heating inclined well for transporting heated air and passing the heated air through the heating inclined well into contaminated soil, thereby thermally desorbing organic pollutants in the contaminated soil; and
- an extraction device comprising a plurality of extraction wells arranged in the contaminated area, a plurality of extraction pipes and a first suction member, wherein the organic pollutants thermally desorbed in the contaminated soil are driven by the power provided by the first suction member to pass the extraction well and sucked into the extraction pipe,
- wherein,
  - the heating inclined well is externally filled with a heat conductive filler selected from one or more of $\alpha$-alumina, zeolite and gravel;
  - the heating pipe is made of a coil pipe, and a plurality of openings are arranged on the heating pipe according to one of the following rules: (1) a first set of the openings in an upper part of the heating pipe are sparsely arranged, and a second set of the openings in a lower part of the heating pipe are densely arranged; (2) the openings are evenly arranged on the heating pipe; or (3) the openings are arranged only in the lower part of the heating pipe;
  - the extraction well includes a heat-resistant material and has a well wall, and a plurality of openings are arranged on the well wall; and
  - a plurality of openings are arranged on the extraction pipe.

20. The in-situ thermal desorption system according to claim 19, wherein the length $L_1$ of the heating inclined well is $$\frac{h}{\sin\theta} \sim \frac{L_2}{\sin\theta},$$

wherein h is the depth of extraction well and $\theta$ is the horizontal inclination angle of the heating inclined well, $L_2$ is the pollution depth; wherein the depth h of the extraction well is less than or equal to the pollution depth $L_2$, and the extraction well spacing is $$\frac{K}{2} + \frac{h}{\tan\theta} \sim K + \frac{L_2}{\tan\theta},$$

wherein K is the distance between the heating inclined wellheads, and the distance between the remediation units is 2 m to 6 m.

* * * * *